United States Patent Office 3,142,463
Patented July 28, 1964

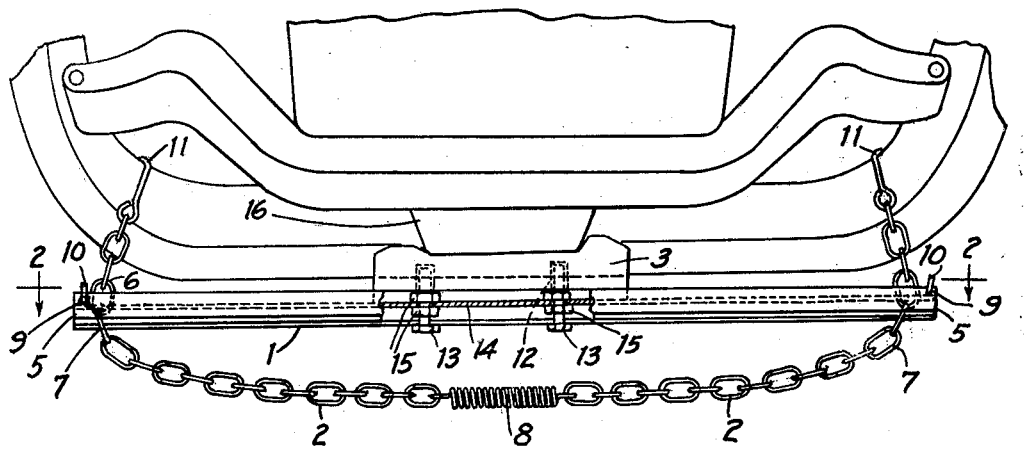
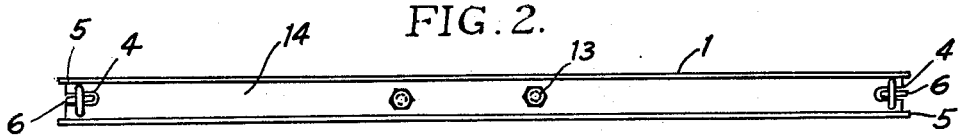
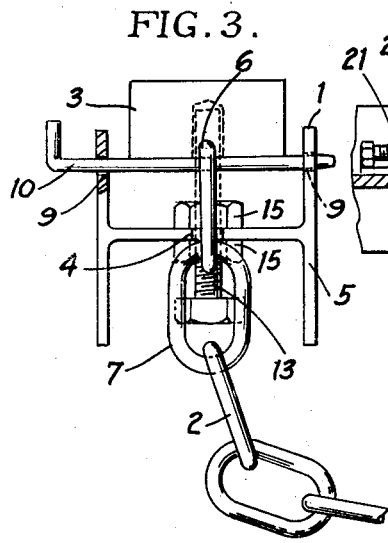
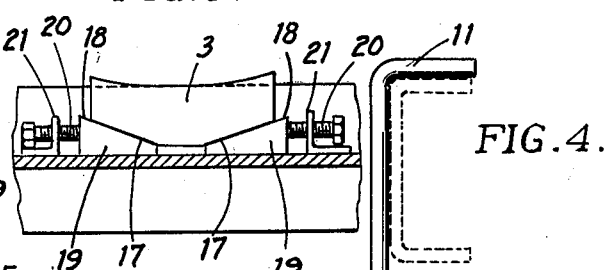
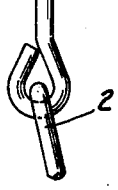
INVENTOR.
GUY DYER

3,142,463
SUSPENSION CRADLE
Guy Dyer, 12 Clark Road, Cincinnati 15, Ohio, assignor of one-half to Garner Dyer, Cincinnati, Ohio
Filed Mar. 28, 1962, Ser. No. 183,299
3 Claims. (Cl. 248—3)

My invention relates to chassis supported temporary suspensions for motors, transmissions and differentials for automobiles.

It is an object of my invention to provide a temporary chassis support for a motor when a transmission has been disconnected and removed from the automobile and normal support between the motor and transmission is removed and permit the automobile while the transmission is removed to be moved to other locations.

It is another object of my invention to provide a suspension cradle to support a motor in proper alignment in relation to a chassis of an automobile when a transmission is removed after being disconnected from the motor for repair and permit the automobile to be moved about without hindrance or disturbing the fixed position of the motor for realignment and reinstallation of the transmission.

Another object is to provide a cradle supported on the chassis of an automobile that will retain a motor, or a transmission, or a differential in fixed position when any one or two of units are disconnected and removed from fixed position on the chassis and permit the automobile to be moved about while the motor, or the transmission, or the differential is off the chassis for repair.

These and other objects will become apparent in the specifications together with the drawing illustrating my preferred embodiment of my invention.

In the drawing:

FIGURE 1 is a fragmentary view in perspective of the underside of an automobile looking towards the front of the automobile and illustrating my cradle suspended from the chassis frame.

FIGURE 2 is a top plan view of my cradle taken on line 2—2 of FIGURE 1.

FIGURE 3 is an end view of the cradle illustrating the method of securing the cradle to the suspension means from the chassis.

FIGURE 4 is a fragmentary end view of the chassis and means to suspend the cradle from the chassis frame.

FIGURE 5 is a fragmentary section of my cradle showing an alternate method for adjusting a spacer shim.

In the art of repairing motors, transmissions and differentials of automobiles it becomes necessary to disconnect and remove one or more of the units from fixed positions on automobile chassis frames. When any one of the units are removed separately, the parts remaining are usually allowed to dangle and the automobile remains stationary in the place of removal of the unit until it is put back in place and reconnected. This results in cluttering up valuable working area with immobile automobiles. To overcome the handicap of immobility during repair I have invented my suspension cradle which secures and maintains the remaining units to the chassis frame in their original and proper locations for reassembly. My invention permits the moving of the automobile to a storage area out of the work area. If desired, the automobile can be hauled over long distances over highways even though the motor, transmission or differential has been removed.

The preferred embodiment of my cradle consists of a beam 1, chains 2 and an adjustable shim 3. The beam has slots 4 in its ends 5 adapted to receive links 6 of the chains that are in longitudinal alignment with the beam. Other links 7 are disposed at right angles to the links 6 in the slots and provide a bearing support for the beam. A compression spring 8 connects the chains ends together and prevent them from hanging and dragging on the pavement while the automobile is moved from place to place. The ends of the beam have holes 9 for a removable slidable pin 10 to prevent the links 6 from leaving the slots 4 while the cradle is in suspension from the chassis. Ends of the chains are provided with hooks that secure and suspend the cradle to and from the chassis frame. The shim 3 is a block having holes 12 for rotatably receiving bolts 13 rotatably extending through holes in a web 14 of the beam. Lock nuts 15 on each side of the web and on the bolts fix the position of the shim and exert pressure between the beam and a transmission housing 16 thereby disposing of any slack in the chains between the beam and chassis. The shim in operation is adjusted to hold the transmission or any other unit in its fixed position relative to the chassis. The shim together with the cradle insures proper realignment when the unit that had been removed is replaced and reconnected.

In FIGURE 5 there is illustrated an alternate adjustment for the shim. Sloping bottoms 17 of the shim are slidably engaged on sloping surfaces 18 of wedges 19. Wedges 19 are slidably mounted on the web of the beam and are moved into wedging position with the shim by means of screws 20. The screws 20 are rotatable in threaded holes in brackets 21 that are fixed to the web of the beam.

In practice my chains are hooked on to the chassis. The cradle together with the shim is brought into contact with the bottom casing of a motor, transmission or differential depending upon which of them is to be removed for repair. The links of the chains are placed in the slots so that there will be a minimum of slack in the chains before the shim is adjusted. Normally this slack will not allow a space more than that equivalent to one-fourth of the link between the top of the shim and the bottom casing of the unit to be removed. The shim is adjusted so that rigidity of the chains is such that the unit supported on the cradle cannot drop down from its proper position of alignment.

Having thus described my invention, I claim:

1. A temporary suspension cradle to support unsupported ends of an assembly when certain elements are removed from said assembly and retain said unsupported end in fixed relation to a frame, said cradle comprising link chains adapted to be disconnectably hooked to said frame, a beam having slots in its end to receive links of said chain to support said beam in relation to said frame, a shim supported on said beam and adapted to be interposed between said beam and said unsupported end of said assembly and bolts to actuate said shim between said beam and said unsupported end to maintain said unsupported end in fixed relation to said frame.

2. A temporary suspension cradle to support an unsupported unit of an automobile drive assembly on a chassis of said automobile during repair and removal of parts of the drive, said cradle comprising link chains adapted to be removably hooked to said chassis, a beam having slots in the ends thereof receiving links of said chains and succeeding links next to said links in said slots providing supporting means for said beam, pins disposed perpendicular of said slots slidable in holes adjacent said slots in said beam to retain said links in said slots, a concave shim supported on said beam adapted to be wedged between said beam and the bottom of said unit to remove slack from said chains and support said transmission in fixed relation to said chassis.

3. A temporary suspension cradle to support an unsupported unit of an automobile driving system on the chassis of said automobile after removal of another unit of said driving system for repair, said cradle comprising link chains adapted to be removably suspended from said chassis, a beam having slots in each of its ends receiving links of said chains and next succeeding links to said links in said slots adapted to support said beam in horizontal relation to said chassis, pins disposed perpendicular of said slots and slidable in said beam to retain said links in said slots, a shim adapted to move vertically from said beam and adapted to be wedged between said beam and a bottom of said unsupported unit and support it in fixed relation to said chassis, wedge means actuated by screws to secure said shim between said beam and unit and disperse slack in said chain between said chassis and beam and retain said unit in fixed relation to said chassis and resilient means connecting loose ends of said chains to permit mobility of said automobile while part of the said driving system is removed and being repaired elsewhere.

References Cited in the file of this patent
UNITED STATES PATENTS

| | | |
|---|---|---|
| 802,394 | Hill | Oct. 24, 1905 |
| 2,279,923 | MacPherson | Apr. 14, 1942 |
| 2,662,716 | Lowrey | Dec. 15, 1953 |
| 2,714,965 | Fitzkee | Aug. 9, 1955 |
| 2,865,585 | Beyer | Dec. 23, 1958 |